(12) United States Patent
Shimamoto et al.

(10) Patent No.: US 12,347,866 B2
(45) Date of Patent: Jul. 1, 2025

(54) LITHIUM ION SECONDARY BATTERY AND PRODUCTION METHOD THEREOF

(71) Applicant: Mazda Motor Corporation, Hiroshima (JP)

(72) Inventors: Kei Shimamoto, Shimonoseki (JP); Takao Fukunaga, Tokyo (JP); Hideyuki Sugiyama, Tokyo (JP); Wataru Masuda, Aki-gun (JP); Hiroki Fujita, Aki-gun (JP); Munetaka Higuchi, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 312 days.

(21) Appl. No.: 17/447,228

(22) Filed: Sep. 9, 2021

(65) Prior Publication Data

US 2022/0085377 A1 Mar. 17, 2022

(30) Foreign Application Priority Data

Sep. 17, 2020 (JP) ................. 2020-156071

(51) Int. Cl.
| | |
|---|---|
| *H01M 4/62* | (2006.01) |
| *H01M 4/58* | (2010.01) |
| *H01M 4/587* | (2010.01) |
| *H01M 10/0525* | (2010.01) |
| *H01M 10/0569* | (2010.01) |
| *H01M 10/0587* | (2010.01) |
| *H01M 4/02* | (2006.01) |

(52) U.S. Cl.
CPC ......... *H01M 4/628* (2013.01); *H01M 4/5825* (2013.01); *H01M 4/587* (2013.01); *H01M 10/0525* (2013.01); *H01M 10/0569* (2013.01); *H01M 10/0587* (2013.01); *H01M 2004/027* (2013.01); *H01M 2004/028* (2013.01); *H01M 2220/20* (2013.01)

(58) Field of Classification Search
CPC ...... H01M 4/628; H01M 4/624; H01M 4/621; H01M 4/5825; H01M 4/587; H01M 4/66; H01M 10/0525; H01M 10/0569; H01M 10/0587; H01M 2004/027; H01M 2004/028; H01M 2220/20
See application file for complete search history.

(56) References Cited

U.S. PATENT DOCUMENTS

| | | | | |
|---|---|---|---|---|
| 6,465,134 | B1 * | 10/2002 | Shibuya | H01M 10/052 429/300 |
| 2010/0015514 | A1 | 1/2010 | Miyagi et al. | |
| 2014/0295288 | A1 | 10/2014 | Ding | |
| 2016/0126543 | A1 | 5/2016 | Ota et al. | |
| 2017/0207486 | A1 | 7/2017 | Wu et al. | |
| 2017/0271091 | A1 | 9/2017 | Abe et al. | |
| 2020/0212493 | A1 | 7/2020 | Busacca et al. | |
| 2020/0280100 | A1 * | 9/2020 | Demeaux | H01M 4/505 |
| 2020/0343581 | A1 | 10/2020 | Fujita et al. | |

FOREIGN PATENT DOCUMENTS

| | | | | |
|---|---|---|---|---|
| CN | 101425611 | A | 5/2009 | |
| CN | 101916878 | A | 12/2010 | |
| CN | 103337658 | A | 10/2013 | |
| CN | 107181003 | A | 9/2017 | |
| CN | 105489857 | * | 6/2018 | ............. H01M 4/36 |
| CN | 109088097 | A | 12/2018 | |
| CN | 109671982 | A | 4/2019 | |
| DE | 112012004415 | T5 | 8/2014 | |
| JP | 2000243447 | A | 9/2000 | |
| JP | 2017021986 | A | 1/2017 | |
| JP | 2019121611 | A | 7/2019 | |

OTHER PUBLICATIONS (Computer-generated translation of CN 105489857) Yu et al., "A High-speed Charging Power Lithium Ion Battery", Jun. 29, 2018.*

* cited by examiner

*Primary Examiner* — Raymond Alejandro
(74) *Attorney, Agent, or Firm* — Alleman Hall & Tuttle LLP

(57) ABSTRACT

A lithium ion secondary battery includes: a positive electrode having a positive electrode active material layer on a surface of a positive electrode collector; a negative electrode a having a negative electrode active material layer on a surface of a negative electrode collector; and a nonaqueous electrolyte. The positive electrode, the negative electrode, and the nonaqueous electrolyte are accommodated in a battery case. The nonaqueous electrolyte contains γ-butyrolactone as a main component of a nonaqueous solvent. A monoalkyl sulfate ion-derived coat is formed on the surface of the positive electrode active material layer. A VC-derived coat is formed on the surface of the negative electrode active material layer.

14 Claims, 3 Drawing Sheets

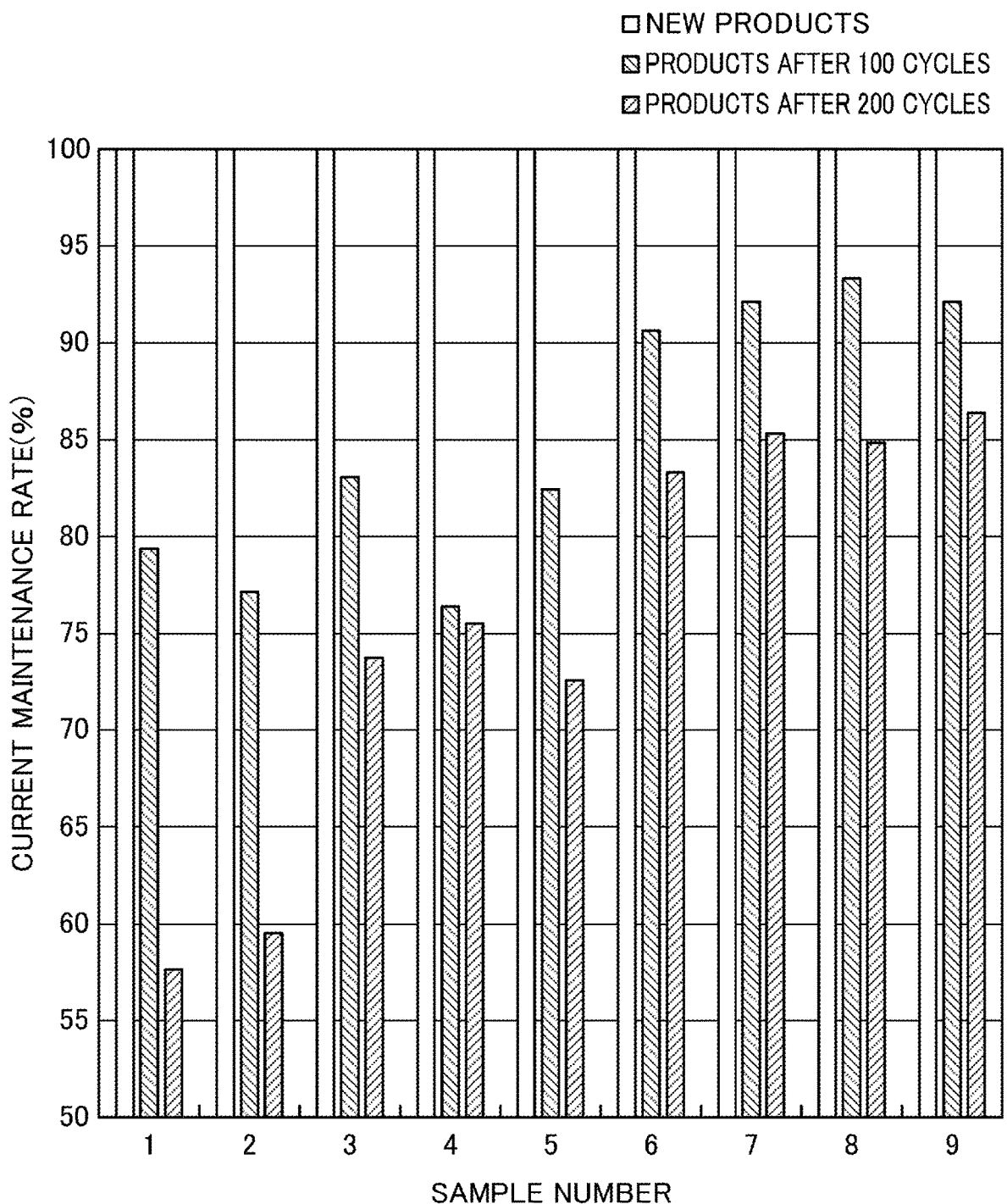

LITHIUM ION SECONDARY BATTERY AND PRODUCTION METHOD THEREOF

CROSS-REFERENCE TO RELATED APPLICATION

This application claims priority to Japanese Patent Application No. 2020-156071 filed on Sep. 17, 2020, the entire disclosure of which is incorporated by reference herein.

BACKGROUND

The present disclosure relates to a lithium ion secondary battery and a production method thereof.

A lithium ion secondary battery mainly includes: a positive electrode and a negative electrode which absorb and release lithium; a nonaqueous electrolyte; and a separator, and is used, for example, in electronic devices such as mobile phones and personal computers, and electronic vehicles. The nonaqueous electrolyte is obtained by dissolving a lithium salt in a nonaqueous solvent such as ethylene carbonate, propylene carbonate, and dimethyl carbonate. Such lithium ion secondary batteries involve problems of volatilization of flammable nonaqueous solvents and release of oxygen due to degradation of a lithium composite oxide used as a positive electrode active material at high temperatures.

To address these problems, Japanese Unexamined Patent Publication No. 2000-243447 discloses using, as a nonaqueous solvent of the lithium ion secondary battery, a solvent mixture of ethylene carbonate, propylene carbonate, and γ-butyrolactone, each of which has a high boiling point.

SUMMARY

γ-butyrolactone is effective in increasing a flash point of the lithium ion secondary battery. However, according to the study of the present inventors, it was found that γ-butyrolactone is degraded on the negative electrode and that the output of the battery decreases due to the degradation product. It is considered that the degradation product moves to the positive electrode, and Li ions are inhibited from entering and exiting to and from the positive electrode.

Therefore, an object of the present invention is to achieve both an increase in the flash point of a lithium ion secondary battery and an improvement in durability of the lithium ion secondary battery, and in particular, to ensure outputs of the lithium ion secondary battery in cold circumstances for a long period of time.

In order to solve the above problems, according to the present invention, γ-butyrolactone is used as a nonaqueous solvent, and a coat is formed on each of positive and negative electrodes to reduce degradation of the γ-butyrolactone on the negative electrode and deterioration of the positive electrode due to a degradation product of the γ-butyrolactone.

Disclosed herein is a lithium ion secondary battery including: a positive electrode having a positive electrode active material layer on a surface of a positive electrode collector; a negative electrode having a negative electrode active material layer on a surface of a negative electrode collector; a nonaqueous electrolyte, the positive electrode, the negative electrode, and the nonaqueous electrolyte being accommodated in a battery case, the nonaqueous electrolyte containing γ-butyrolactone (hereinafter "GBL") as a main component of a nonaqueous solvent; a coat (SEI layer) containing a component derived from vinylene carbonate (hereinafter "VC"), on the surface of the negative electrode active material layer; and a coat containing a component derived from monoalkyl sulfate ions, on a surface of the positive electrode active material layer.

With this configuration, the nonaqueous electrolyte contains GBL as a base. The GBL is a high-dielectric constant solvent having a large intermolecular bonding force. The GBL also has a low melting point and stays liquid even at low temperatures. The nonaqueous electrolyte containing GBL is therefore advantageous in increasing the flash point of the lithium ion secondary battery and improving outputs of the lithium ion secondary battery in cold circumstances.

The VC-derived coat formed on the surface of the negative electrode active material layer prevents the reduction and degradation of the GBL on the negative electrode. Even if a degradation product of the GBL generated on the negative electrode moves to the positive electrode, the monoalkyl sulfate ion-derived coat formed on the surface of the positive electrode active material layer prevents deterioration of the positive electrode due to the degradation product. Oxidation and degradation of the GBL on the positive electrode are also prevented.

In this manner, according to the present disclosure, the presence of the VC-derived coat on the negative electrode active material layer and the monoalkyl sulfate ion-derived coat on the positive electrode active material layer makes it possible to substantially prevent the cycle deterioration of the lithium ion secondary battery including the nonaqueous electrolyte that contains GBL as a base. For example, the lithium ion secondary battery can ensure high output properties for a long period of time even when used under a sub-zero environment.

In one embodiment, a coat containing components each derived from VC or from the monoalkyl sulfate ions is formed on the surface of the negative electrode active material layer. This is advantageous in substantially preventing reduction and degradation of GBL on the negative electrode.

In one embodiment, a coat containing components each derived from the monoalkyl sulfate ions or from bis(oxalate) borate (hereinafter "BOB") ions is formed on the surface of the positive electrode active material layer. This is advantageous in prevention of oxidation and degradation of GBL on the positive electrode and degradation of the positive electrode due to the degradation product.

In one embodiment, the positive electrode contains lithium iron phosphate having an olivine crystal structure as a positive electrode active material. This is advantageous in ensuring thermal stability in charging the lithium ion secondary battery, and can increase a discharge voltage. In this case, since the monoalkyl sulfate ion-derived coat protects the positive electrode active material layer from the degradation product of GBL, degradation of lithium iron phosphate (elution of Fe) is prevented.

In one embodiment, the negative electrode contains a carbon material as a negative electrode active material. This is advantageous in increasing the battery capacity.

If GBL is employed as a nonaqueous solvent with the use of a graphite-based carbon material as a negative electrode active material, a solid electrolyte interface (SEI) layer is less prone to be formed on the surface of the negative electrode, which is a problem. The SEI layer is formed by reduction and degradation of the solvent in the electrolyte while charging, and solvated Li ions are de-solvated when passing through the SEI layer and are then inserted between graphite layers individually. If the formation of the SEI layer is insufficient, the solvated Li ions are inserted directly between the graphite layers (co-insertion), the degradation reaction of the solvent proceeds between the graphite layers, and the crystal structure of graphite is broken, thereby reducing the cycle stability performance of the battery.

In contrast, in the present embodiment, the solvated Li ions are de-solvated efficiently through the VC- or monoalkyl sulfate ion-derived coat (SEI layer), and the degradation reaction of the solvent between the graphite layers is substantially reduced, thereby improving the cycle stability performance.

For example, from the viewpoint of preventing the degradation of GBL, used as a negative electrode active material in one preferred embodiment is a carbon material having a low graphitization degree (e.g., 0.015 rad or more as a half-power band width of a diffraction peak at a diffraction angle $2\theta=26.6°$ using a CuKα ray) such as hard carbon.

In one embodiment, the nonaqueous electrolyte contains, as the nonaqueous solvent, dibutyl carbonate (hereinafter "DBC") in addition to the GBL. Although GBL has a high viscosity, which causes poor wettability to the separator, the addition of DBC improves wettability of the nonaqueous electrolyte to the separator. This contributes to an increase in ion conductivity and is advantageous in improving output properties of the lithium ion secondary battery. Moreover, DBC has a high boiling point (about 206° C.) and is thus preferred from the viewpoint of reducing volatilization of the nonaqueous solvent. As the DBC, n-DBC having a high flash point (91° C.) can be suitably employed.

The nonaqueous solvent may contain ethylene carbonate (hereinafter "EC") in addition to GBL and DBC, or may further contain EC and propylene carbonate (hereinafter "PC"). The addition of EC or PC that is a high boiling point, high-dielectric constant solvent advantageously increases the flash point of the lithium ion secondary battery and improves outputs of the lithium ion secondary battery in cold circumstances.

In the case where the nonaqueous solvent is a solvent mixture as described above, the concentration of the GBL in the nonaqueous solvent is set to be 50 vol % or more. In this case, the concentration of the DBC is suitably 5 vol % or more to 15 vol % or less. If EC or PC is added, each concentration is suitably 5 vol % or more to 30 vol % or less. If both of EC and PC are added, the concentration of the EC and PC together is 10 vol % or more to 40 vol % or less.

Disclosed herein is a production method of a lithium ion secondary battery including: a positive electrode having a positive electrode active material layer on a surface of a positive electrode collector; a negative electrode having a negative electrode active material layer on a surface of a negative electrode collector; and a nonaqueous electrolyte, the positive electrode, the negative electrode, and the nonaqueous electrolyte being accommodated in a battery case. The method includes: accommodating the positive electrode and the negative electrode in the battery case and further encapsulating the nonaqueous electrolyte into the battery case and sealing the battery case, thereby obtaining a battery assembly, the nonaqueous electrolyte being obtained by dissolving a lithium salt in a nonaqueous solvent containing GBL as a main component and containing VC and lithium monoalkyl sulfate, and subjecting the battery assembly to an initial charge process, thereby forming a coat containing a component derived from the VC on the surface of the negative electrode active material layer and forming, on the surface of the positive electrode active material layer, a coat containing a component derived from lithium monoalkyl sulfate.

The above-described lithium ion secondary battery can be obtained by this production method. This production method allows formation of the coat derived from the monoalkyl sulfate ions generated by ionization of the lithium monoalkyl sulfate on the surface of the positive electrode active material layer, and the coat derived from VC and monoalkyl sulfate ions on the surface of the negative electrode active material layer. Accordingly, the resistance to insertion and extraction of Li ions into and from the negative electrode active material decreases.

In the production method, the nonaqueous electrolyte is obtained by dissolving a lithium salt in a nonaqueous solvent containing GBL as a main component and containing VC, lithium monoalkyl sulfate, and LiBOB.

The coat containing components each derived from BOB ions generated by ionization of the LiBOB or from the monoalkyl sulfate ions is formed on the surface of the positive electrode active material layer.

In the lithium ion secondary battery and the production method thereof, the lithium monoalkyl sulfate is expressed by a general formula (1): $RO-SO_3Li$, where R is a linear or branched alkyl group with a carbon number of 1 to 4. That is, the lithium monoalkyl sulfate is preferably at least one kind selected from the group consisting of $CH_3OSO_3Li$, $C_2H_5OSO_3Li$, $CH_3CH_2CH_2OSO_3Li$, $CH_3CH(CH_3)OSO_3Li$, $CH_3CH_2CH_2CH_2OSO_3Li$, $CH_3CH_2CH(CH_3)OSO_3Li$, $(CH_3)_2CHCH_2OSO_3Li$, and $C(CH_3)_3OSO_3Li$, and more preferably $C_2H_5OSO_3Li$.

The concentration of VC in the nonaqueous electrolyte is preferably 0.3 mass % or more from the viewpoint of forming a coat (SEI layer) capable of preventing reduction and degradation of GBL on the surface of the negative electrode active material layer. However, the concentration of the VC is preferably 3 mass % or less because a VC-derived coat having a larger thickness causes greater resistance in insertion and desorption of Li ions to and from the negative electrode active material. The concentration of the VC is more preferably 0.5 mass % or more to 2.5 mass % or less, and still more preferably 1 mass % or more to 2 mass % or less.

The concentration of lithium monoalkyl sulfate in the nonaqueous electrolyte is preferably 0.3 mass % or more from the viewpoint of forming, on the surface of the positive electrode active material layer, a coat suitable for protecting the positive electrode active material. However, the concentration of this lithium monoalkyl sulfate is preferably 1.5 mass % or less because a monoalkyl sulfate ion-derived coat having a larger thickness causes greater resistance in insertion and desorption of Li ions to and from the positive electrode active material. The concentration of the lithium monoalkyl sulfate is more preferably 0.5 mass % or more to 1 mass % or less.

The concentration of LiBOB in the nonaqueous electrolyte is preferably 0.3 mass % or more from the viewpoint of forming, on the surface of the positive electrode active material layer, a coat suitable for protecting the positive electrode active material. However, the concentration of the LiBOB is preferably 1.5 mass % or less because a BOB ion-derived coat having a larger thickness causes greater resistance in insertion and desorption of Li ions to and from the positive electrode active material. The concentration of the LiBOB is more preferably 0.5 mass % or more to 1 mass % or less.

BRIEF DESCRIPTION OF THE DRAWINGS

FIG. 4 is a graph showing cycle deterioration characteristics of a maximum current value at −18° C.

DETAILED DESCRIPTION

An embodiment of the present disclosure will be described with reference to the drawings. The following description of a preferred embodiment is merely illustrative in nature and is not intended to limit the present disclosure and applications or uses thereof.

A lithium ion secondary battery according to the present embodiment is suitable for use in an electronic device, an electric vehicle, a hybrid vehicle, and the like.

<General Configuration of Lithium Ion Secondary Battery>

Figure 1:
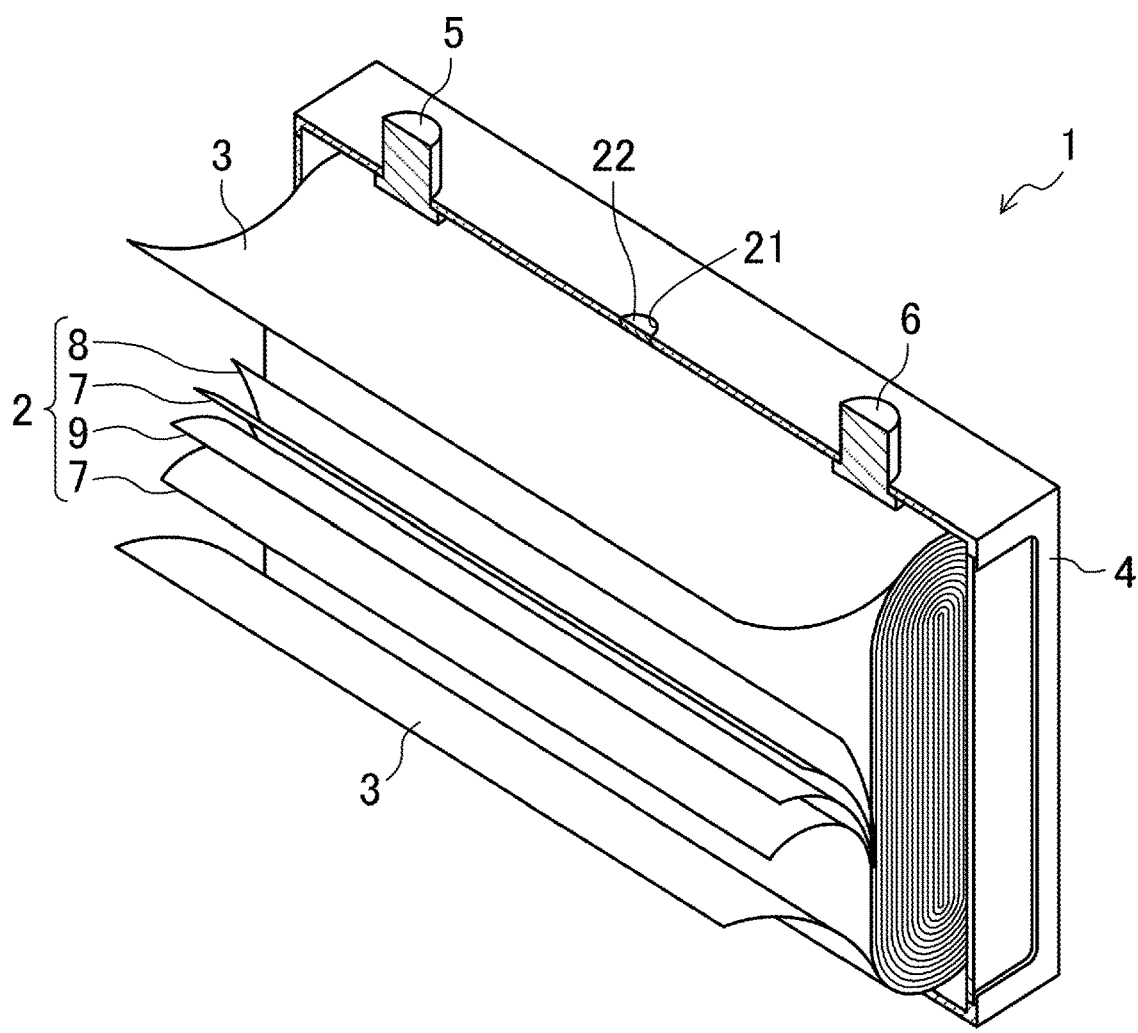
FIG. 1 is a perspective view of an internal structure of a lithium ion secondary battery, part of which is cut open.

As illustrated in FIG. 1, the lithium ion secondary battery 1 includes a wound body 2 in which a plurality of thin sheet-like battery components are wound together into a flat spiral shape (like a roll of fabric), an insulating sheet 3 covering the outer periphery of the wound body 2, and a battery case 4 accommodating these components of the battery. A positive electrode terminal 5 and a negative electrode terminal 6 are provided on an upper surface of the battery case 4.

The wound body 2 includes two sheet-like separators 7, a sheet-like positive electrode 8 connected to the positive electrode terminal 5, and a sheet-like negative electrode 9 connected to the negative electrode terminal 6. The wound body 2 is formed by winding, into a flat spiral shape, a stacked body obtained by stacking one of the separators 7, the negative electrode 9, the other separator 7, and the positive electrode 8 in this order.

Each of the separators 7 is impregnated with a nonaqueous electrolyte. The nonaqueous electrolyte is obtained by dissolving a Li salt in a nonaqueous solvent containing GBL as a main component. The upper surface of the battery case 4 has an inlet 21 for the nonaqueous electrolyte. The inlet 21 is closed with a stopper 22.

Note that the battery components may be a stacked body obtained by layering and folding sheet-like battery components in a zigzag shape, instead of a form of a wound body. The battery components in the form of the stacked body can be arranged up to a corner of the space in the battery case, which increases the capacity of the battery.

[Positive Electrode 8]

Figure 2:
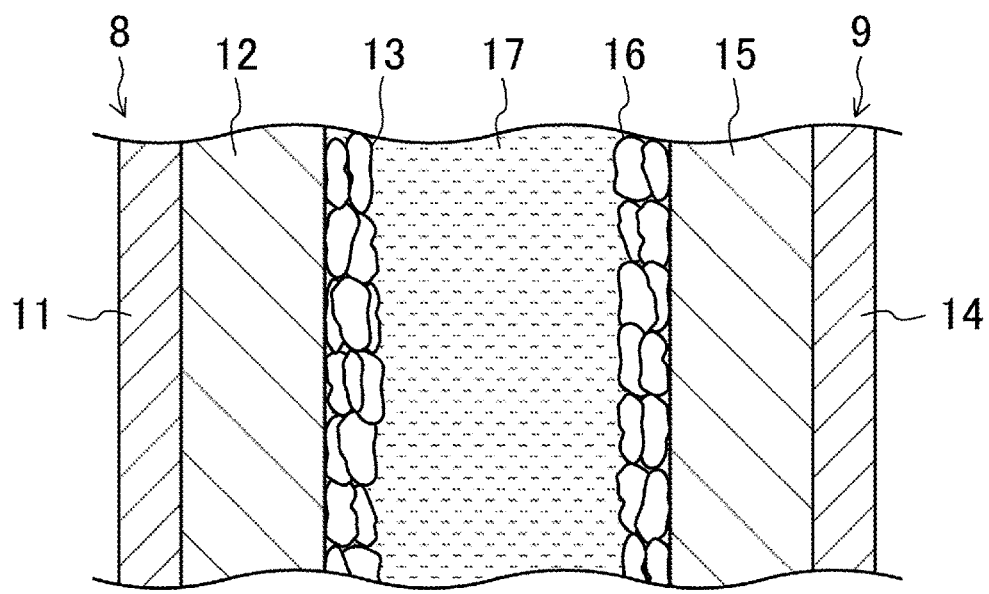
FIG. 2 is a cross-sectional view of a stacked structure of positive and negative electrodes of the lithium ion secondary battery.

As illustrated in FIG. 2, the positive electrode 8 is formed by providing a positive electrode active material layer 12 on a surface of a positive electrode collector 11 (a surface opposite to the negative electrode 9). The collector 11 is made of a metal thin film having electrical conductivity. A preferred collector 11 can be an aluminum foil. The positive electrode active material layer 12 is formed by mixing a positive electrode active material and assistants (a binder and a conductive assistant) and then applying the mixture to the collector 11.

A preferred positive electrode active material includes: a composite metal oxide of lithium and one or more kinds selected from the group consisting of cobalt, manganese, and nickel; a phosphoric acid-based lithium compound; and a silicic acid-based lithium compound. In particular, a phosphoric acid-based lithium is suitably employed. These positive electrode active materials may be used alone or in a combination of two or more of them.

Examples of a preferred phosphoric acid-based lithium compound include $LiMPO_4$ (M=transition metal Fe, Co, Ni, Mn, and the like) having an olivine crystal structure and $Li_2MPO_4F$ (M=transition metal Fe, Co, Ni, Mn, and the like). Among these, lithium iron phosphate $LiFePO_4$ is preferred. Examples of the silicic acid-based lithium compound include $Li_2MSiO_4$ (M=transition metal Fe, Co, Ni, Mn, and the like).

As the binder, polyvinylidene fluoride (PVdF) can be suitably employed. As the conductive assistant, any of carbon black, acetylene black, carbon nanofibers (CNFs), and the like can be employed.

A monoalkyl sulfate ion-derived coat 13 in contact with the nonaqueous electrolyte 17 is formed on a surface of the positive electrode active material layer 12. The separators 7 are omitted in FIG. 2.

[Negative Electrode 9]

The negative electrode 9 is formed by providing a negative electrode active material layer 15 on a surface of a negative electrode collector 14 (a surface opposite to the positive electrode 8). The collector 14 is made of a metal thin film having electrical conductivity. A preferred collector 14 includes a copper foil. The negative electrode active material layer 15 is formed by mixing a negative electrode active material and assistants (a binder and a conductive assistant) and then applying the mixture to the collector 14.

As the negative electrode active material, a graphite-based carbon material such as artificial graphite or natural graphite can be suitably employed. As the graphite-based carbon material, one having a low graphitization degree is preferred from the viewpoint of improving an ability of absorbing and releasing lithium ions. For example, the graphitization degree of the graphite-based carbon material is preferably 0.015 rad or more as a half-power band width of a diffraction peak at a diffraction angle $2\theta=26.6°$ using a CuKα ray. Artificial graphite and hard carbon, each of which has a low graphitization degree, are suitable as a negative electrode active material. Natural graphite alone has high crystallinity, thereby easily deteriorated. Thus, surface-treated natural graphite and artificial graphite are suitably used in combination.

As the binder, styrene-butadiene rubber (SBR), a combination (SBR-CMC) of styrene-butadiene rubber (SBR) and carboxymethylcellulose as a thickener, PVdF, an imide-based binder, a polyacrylic acid-based binder, or the like may be suitably employed. As the conductive assistant, carbon black, acetylene black, carbon nanofibers (CNFs), or the like can be suitably employed.

A VC-derived coat (SEI layer) 16 in contact with the nonaqueous electrolyte 17 is formed on a surface of the negative electrode active material layer 15.

[Separator 7]

The separator 7 is a porous thin film made of a synthetic resin, such as polyethylene and polypropylene, and is impregnated with the nonaqueous electrolyte 17.

[Nonaqueous Electrolyte]

The nonaqueous electrolyte is obtained by dissolving a lithium salt (support electrolyte) in a nonaqueous solvent containing GBL as a main component. The nonaqueous electrolyte is a liquid at −40° C. to 70° C., and an additive is added thereto as required.

The nonaqueous solvent may be a solvent mixture that contains, in addition to GBL, one or more kinds selected from various organic solvents including cyclic carbonates such as EC and PC, cyclic esters such as γ-valerolactone (GVL), chain carbonates such as DBC, ethers, sulfones, and the like.

DBC improves wettability of the nonaqueous electrolyte to the separators 7. Such a wettability improving solvent can be, for example, methylbutyl carbonate (MBC) and ethylbutyl carbonate (EBC). Among them, n-DBC having a high flash point (91° C.) is suitably employed. The concentration of the wettability improving solvent in the nonaqueous solvent may be set to be 5 vol % or more to 15 vol % or less.

A preferred example of the solvent mixture is a solvent mixture of GBL, EC and/or PC, and DBC. In this solvent mixture, the following volume percentages of the respective substances are particularly suitable: the concentration of GBL is 50 vol % or more; if EC or PC is added alone, each concentration is 5 vol % or more to 30 vol % or less; if both of EC and PC are added, the concentration of the EC and PC together is 10 vol % or more to 40 vol % or less; and the concentration of DBC is 5 vol % or more to 15 vol % or less.

A preferred lithium salt includes $LiPF_6$, $LiBF_4$, $LiPO_2F_2$, $LiN(SO_2F)_2$, $LiN(SO_2CF_3)_2$, and $LiN(SO_2C_2F_5)_2$. The lithium salts may be used alone or in a combination of two or more of them. The concentration of the lithium salt in the nonaqueous electrolyte may be, for example, 0.5M or more to 2.0M or less.

In addition, in assembling of the lithium ion secondary battery, the nonaqueous electrolyte contains lithium monoalkyl sulfate for forming the monoalkyl sulfate ion-derived coat 13 on the surface of the positive electrode active material layer 12, and VC for forming the VC-derived coat (SEI layer) 16 on the surface of the negative electrode active material layer 15. LiBOB may be added to the nonaqueous electrolyte in order to form the coat 13 derived from the monoalkyl sulfate ions and the BOB ions on the surface of the positive electrode active material layer 12. Most of the monoalkyl sulfate ions, the BOB ions, and the VC are consumed for forming the coats 13 and 16 by the initial charge process, but some of the monoalkyl sulfate ions, the BOB ions, and the VC remain in the nonaqueous electrolyte even after the process. In some cases, the monoalkyl sulfate ions, the BOB ions, or the VC do not remain in the nonaqueous electrolyte.

<Problem of GBL Degradation>

If the negative electrode 9 has a defective SEI layer formed thereon, a reduction and degradation reaction of the GBL in the nonaqueous electrolyte occurs on the negative electrode 9 in charging of the lithium ion secondary battery 1. Alternatively, when the battery 1 is overdischarged, the collector (copper) 14 of the negative electrode 9 is dissolved in the nonaqueous electrolyte 17, and a reduction and degradation reaction of the GBL occurs in the negative electrode 9.

Degradation products of the GBL, when diffused in the nonaqueous electrolyte 17, inhibit regeneration of the normal SEI layer nearby, and cause clogging of the separator 7. As a result, the cycle characteristics of the battery 1 deteriorate due to the formation of the defect SEI layer and the inhibition of the movement of the Li ions passing through the separator 7. Further, when the degradation products of the GBL move to the positive electrode 8, the binder of the positive electrode active material layer 12 is degraded and the positive electrode active material is eluted, which deteriorates the trapping property of Li ions in the positive electrode 8.

<Measures Against GBL Degradation>

According to the present embodiment, to address the problem of the GBL degradation, the monoalkyl sulfate ion-derived coat 13 is formed on the surface of the positive electrode active material layer 12, and the VC-derived coat (SEI layer) 16 is formed on the surface of the negative electrode active material layer 15, as described above.

The monoalkyl sulfate ion-derived coat 13 is generated in initial charging, which will be described later, of the lithium ion secondary battery. Although the specific mechanism of the generation of the coat 13 is unknown, it is assumed that the monoalkyl sulfate ions in the nonaqueous electrolyte are oxidized, degraded, and polymerized, thereby generating the coat 13. The term "monoalkyl sulfate ion-derived coat" 13 used herein expresses that the coat contains a component derived from monoalkyl sulfate ions, and the coat 13 may contain a degradation product produced by the initial charging of another solvent or a supporting electrolyte of the nonaqueous electrolyte which is not derived from the monoalkyl sulfate ions. For example, the coat 13 may contain a compound obtained by oxidizing, degrading, and polymerizing BOB ions.

The VC-derived coat 16 is generated in initial charging, which will be described later, of the lithium ion secondary battery. Although the specific mechanism of the generation of the coat 16 is unknown, it is assumed that the VC in the nonaqueous electrolyte is reduced, degraded, and polymerized, thereby generating the coat 16. The term "VC-derived coat" 16 used herein expresses that the coat 16 contains a component derived from VC, and the coat 16 may contain a degradation product produced by the initial charging of another solvent or a supporting electrolyte of the nonaqueous electrolyte which is not derived from the VC. For example, the coat 16 may contain a compound obtained by oxidizing, degrading, and polymerizing monoalkyl sulfate ions.

The VC-derived coat 16 covering the surface of the negative electrode active material layer 15 prevents the reduction and degradation, on the negative electrode, of the GBL in the nonaqueous electrolyte. If the GBL is degraded on the negative electrode, the degradation products are diffused toward the positive electrode. However, the surface of the positive electrode active material layer 12 is covered with the monoalkyl sulfate ion-derived coat 13. The monoalkyl sulfate ion-derived coat 13 therefore prevents the battery output decrease caused by the broken binder of the positive electrode active material layer 12 caused by the degradation products of the GBL. In addition, the monoalkyl sulfate ion-derived coat 13 is advantageous in maintaining the cycle characteristics as not inhibiting the Li ions from being inserted into and desorbed from the crystal structure of the positive electrode active material.

<Production Method of Lithium Ion Secondary Battery>

The above lithium ion secondary battery can be produced by a method including the following steps.

[Battery Assembly Step]

A positive electrode active material and assistants (a binder and a conductive assistant) are kneaded to prepare a mixture in a slurry form. The mixture is applied to a collector 11 and dried, thereby forming a sheet-like positive electrode 8 in which the positive electrode active material layer 12 is formed on a surface of the collector 11.

A negative electrode active material and assistants (a binder and a conductive assistant) are kneaded to prepare a mixture in a slurry form. The mixture is applied to a collector 14 and dried, thereby forming a sheet-like negative electrode 9 in which the negative electrode active material layer 15 is formed on a surface of the collector 14.

The sheet-like positive and negative electrodes 8 and 9 are stacked on each other, with one of the separators 7 interposed between the positive and negative electrodes 8 and 9, thereby obtaining an electrode element. Positive and negative leads are attached to the electrode element, and this electrode element is accommodated in a battery case 4.

A nonaqueous electrolyte, which is obtained by dissolving a Li salt in a nonaqueous solvent containing GBL as a main component, is introduced into the battery case 4 from an inlet 21. The inlet 21 is sealed with the stopper 22, thereby obtaining a battery assembly. Lithium monoalkyl sulfate and VC are previously added to the nonaqueous electrolyte. LiBOB is added to the nonaqueous solvent as necessary.

[Initial Charge (Pre-Charge) Process]

The battery assembly is subjected to an initial charge process, thereby forming coats 13 and 16. The initial charge is performed such that the electric potential of the negative electrode 9 is equal to or below the reduction potential of VC. As the charge process, either a constant-current (CC) charge process or a constant-current constant-voltage (CCCV) charge process in which constant-current charge is followed by constant-voltage charge may be employed.

The initial charge process brings, on the surface of the positive electrode active material layer 12, the coat 13 derived from lithium monoalkyl sulfate ions generated by ionization of the lithium monoalkyl sulfate, and the coat 16 derived from VC on the surface of the negative electrode active material layer 15. If LiBOB is added to the nonaqueous electrolyte, the coat 13 on the surface of the positive electrode active material layer 12 contains a compound derived from BOB ions generated by ionization of LiBOB. The coat 16 on the surface of the negative electrode active material layer 15 contains a compound derived from monoalkyl sulfate ions and a compound derived from BOB ions.

The gas generated in association with the formation of the coats 13 and 16 by the initial charge process is removed from the battery case.

[Full Charge Process and Aging Process]

After the initial charge process, the lithium ion secondary battery is full charged to its upper limit voltage. The initial discharge capacity is checked and then an aging process for checking the presence or absence of a battery failure is performed on the lithium ion secondary battery.

<Characteristic Test of Lithium Ion Secondary Battery>

Lithium ion secondary batteries according to the respective samples having the compositions of the nonaqueous electrolyte shown in Table 1 were produced in accordance with the above-described production method. In Table 1, "RO—SO$_3$Li" is lithium monoalkyl sulfate. Lithium ethyl sulfate C$_2$H$_5$OSO$_3$Li was used in the property test.

TABLE 1

| | Li Salt (mol) | Solvent (vol %) | | | | Additive (mass %) | | |
|---|---|---|---|---|---|---|---|---|
| | LiPF$_6$ | EC | PC | GBL | DBC | VC | RO—SO$_3$Li | LiBOB |
| Sample 1 | 1 | 20 | 0 | 70 | 10 | 1.0 | 0 | 0 |
| Sample 2 | 1 | 10 | 10 | 70 | 10 | 1.0 | 0 | 0 |
| Sample 3 | 1 | 20 | 0 | 70 | 10 | 2.0 | 0 | 0 |
| Sample 4 | 1 | 20 | 0 | 70 | 10 | 3.0 | 0 | 0 |
| Sample 5 | 1 | 20 | 0 | 70 | 10 | 2.0 | 0.5 | 0 |
| Sample 6 | 1 | 20 | 0 | 70 | 10 | 2.0 | 0.5 | 0.5 |
| Sample 7 | 1 | 20 | 0 | 70 | 10 | 1.0 | 0.5 | 1.0 |
| Sample 8 | 1 | 10 | 10 | 70 | 10 | 2.0 | 0.5 | 0.5 |
| Sample 9 | 1 | 10 | 10 | 70 | 10 | 1.0 | 0.5 | 1.0 |

LiFePO$_4$ (positive electrode active material) and carbon black (conductive assistant) were mixed, and a binder solution previously obtained by dissolving PVdF (binder) was then added to the mixture and mixed. Thus, a positive electrode mixture in the form of paste was prepared. This positive electrode mixture was applied to a surface of an aluminum foil (collector), then dried, and pressurized. Thus, a positive electrode was produced. Hard carbon (negative electrode active material) and carbon black (conductive assistant) were mixed, and a binder solution previously obtained by dissolving SBR-CMC (binder) was then added to the mixture and mixed. Thus, a negative electrode mixture in the form of paste was prepared. This negative electrode mixture was applied to a surface of a copper foil (collector), then dried, and pressurized. Thus, a negative electrode was produced. The positive electrode, a microporous polypropylene film (separator), and the negative electrode were stacked in this order, and an electrolyte (support electrolyte; LiPF$_6$=1M) containing each nonaqueous solvent in composition described in Table 1 was added to the stacked body. Thus, each sample (full cell) for characteristic evaluation was produced.

The samples were subjected to a cycle deterioration test (measurement of the maintenance rate of the CCA current before and after the cycle deterioration test). Conditions for the cycle deterioration tests are as follows. That is, the battery temperature was 60° C.; the battery capacity was 3 Ah; the depth of discharge (DOD) was 100%; and the charge and discharge conditions were 1C.

Figure 3:
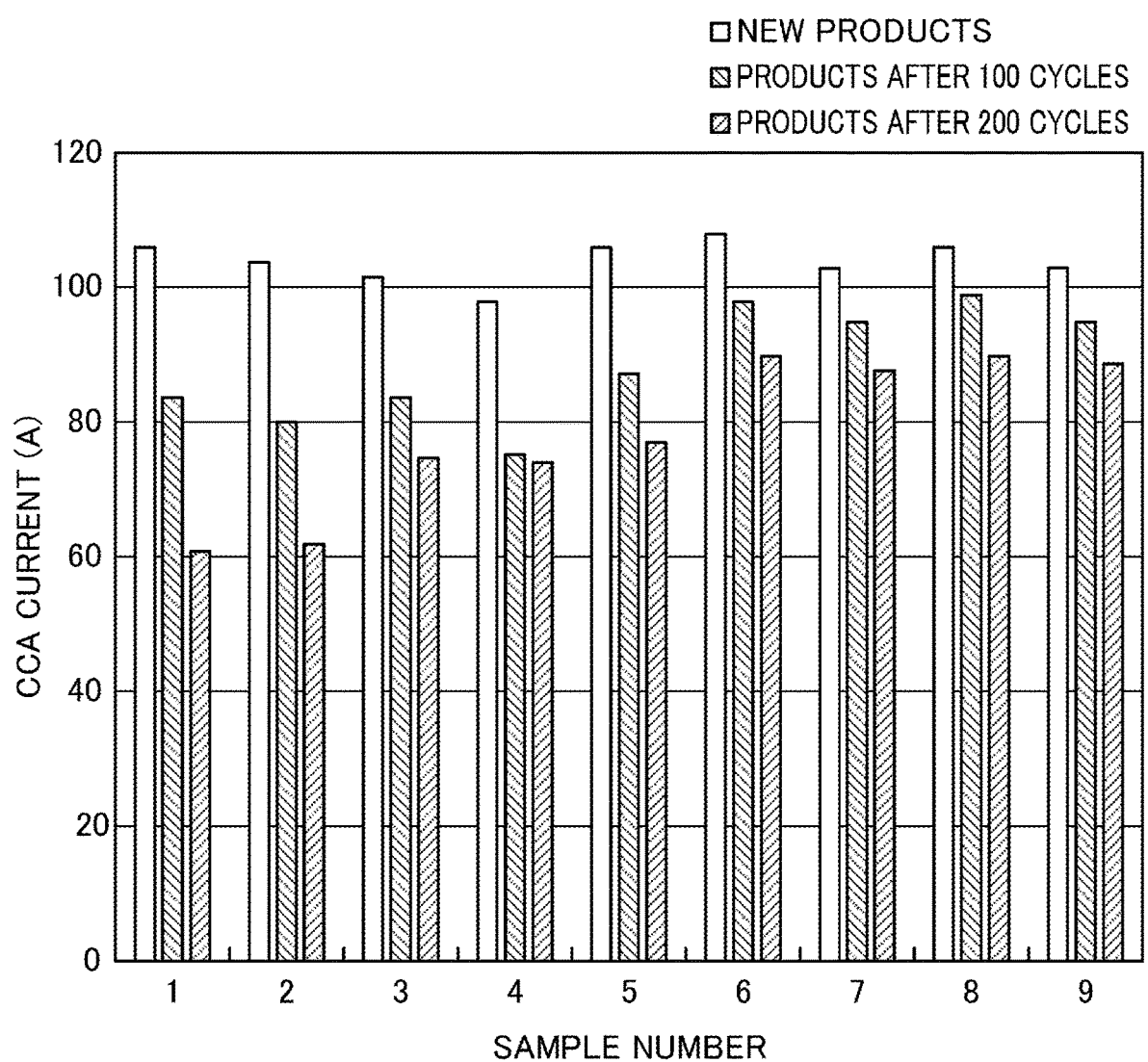
FIG. 3 is a graph showing cycle deterioration characteristics of a discharge capacity maintenance rate.

FIG. 3 shows the CCA currents before and after the cycle deterioration test. FIG. 4 shows the maintenance rate of the CCA current. This CCA current is the maximum current at 1.8 V from a constant current discharge from 100% of SOC at a battery temperature of −18° C.

Samples 1, 3 and 4 (the VC amount were greater in this order, and there is no addition of RO—SO$_3$Li or LiBOB) show that Samples 3 and 4, as compared with Sample 1, achieve reductions in the cycle deterioration characteristic, but that Sample 4 (VC=3.0 mass %) exhibits a lower degree of reduction in the cycle deterioration, as compared with Sample 3 (VC=2.0 mass %). This demonstrates that it is not preferable to add an excessive amount of VC.

Comparison between Samples 3 and 5 (VC=2.0 mass %, the latter contains RO—SO$_3$Li added) shows that the latter has a greater CCA current, according to FIG. 3. According to FIG. 4, Samples 3 and 5 have substantially equal current maintenance rates. This demonstrates that the cycle deterioration is reduced by the addition of RO—SO$_3$Li.

According to FIG. 3, Sample 6 (containing RO—SO$_3$Li and LiBOB added) has a greater CCA current than Sample 5 (added with RO—SO$_3$Li). According to FIG. 4, Sample 6 has a higher current maintenance rate. This result demonstrates that using RO—SO$_3$Li and LiBOB in combination is advantageous in reducing the cycle deterioration. Comparison between Samples 7 and 6 (the former contains more LiBOB than the latter) shows that there is no significant difference in the CCA current, according to FIG. 3. According to FIG. 4, Sample 7 containing more LiBOB exhibits a higher current maintenance rate.

Samples 2, 8, and 9 were obtained by replacing part of EC with PC. According to FIGS. 3 and 4, Samples 8 and 9 containing RO—SO$_3$Li and LiBOB added have higher CCA currents and current maintenance rates. This demonstrates that the addition of RO—SO$_3$Li and LiBOB is advantageous in reducing the cycle deterioration even in the case where part of EC is replaced with PC.

It was confirmed by analysis of the negative electrode that the positive electrode active material was protected by the coat derived from RO—SO$_3$ ions. That is, in Samples 1 to 4 containing no RO—SO$_3$Li, precipitation of Fe was observed on the negative electrode. On the other hand, in Samples 5 to 9 containing RO—SO$_3$Li added, no precipitation of Fe on the negative electrode was observed. The precipitation of Fe on the negative electrode in Samples 1 to 4 is due to the elution of LiFePO$_4$ as the positive electrode active material in the nonaqueous electrolyte. It is considered that no precipitation of Fe was observed on the negative electrode in Samples 5 to 9 because the RO—SO$_3$ ion-derived coat was formed on the surface of the positive electrode active material layer, and this coat protected the positive electrode active material.

The electrolyte of each of the samples contains DBC in addition to EC and GBL as nonaqueous solvents. Without DBC, the electrolyte was not smoothly introduced and the cycle life of the thus-obtained battery was short. This is because the electrolyte that does not contain DBC has poor wettability to the separator. In fact, it was confirmed that when an electrolyte containing EC and GBL and not containing DBC was added dropwise onto the separator, the contact angle was large and the wettability was poor.

In each of the samples, on the other hand, the electrolyte was smoothly introduced and the battery could withstand the cycle test. This is because the addition of DBC to the nonaqueous electrolyte improves the wettability to the separator. That is, if GBL having a high viscosity is employed as a nonaqueous solvent of an electrolyte, DBC can be suitably added to improve the wettability to the separator.

As described above, the lithium ion secondary battery according to the embodiment is expected to exhibit good start-up properties at low temperatures for a long period of time when used as an alternative battery for a 12V lead battery and as a battery in a motor for starting an engine.

The invention claimed is:

1. A lithium ion secondary battery comprising: a positive electrode having a positive electrode active material layer on a surface of a positive electrode collector; a negative electrode having a negative electrode active material layer on a surface of a negative electrode collector; a nonaqueous electrolyte, the positive electrode, the negative electrode, and the nonaqueous electrolyte being accommodated in a battery case,
the nonaqueous electrolyte containing γ-butyrolactone as a main component of a nonaqueous solvent;
a coat containing a component derived from vinylene carbonate on a surface of the negative electrode active material layer; and
a coat containing a component derived from monoalkyl sulfate ions on a surface of the positive electrode active material layer, wherein
the coat formed on the surface of the positive electrode active material layer further contains a component derived from bis(oxalate)borate ions,
one surface of the coat formed on the surface of the negative electrode active material layer directly contacts the surface of the negative electrode active material layer, whereas the other surface of the coat formed on the surface of the negative electrode active material layer directly contacts the nonaqueous electrolyte, and
one surface of the coat formed on the surface of the positive electrode active material layer directly contacts the surface of the positive electrode active material layer, whereas the other surface of the coat formed on the surface of the positive electrode active material layer directly contacts the nonaqueous electrolyte.

2. The lithium ion secondary battery of claim 1, wherein the coat formed on the surface of the negative electrode active material layer further contains a component derived from the monoalkyl sulfate ions.

3. The lithium ion secondary battery of claim 1, wherein the positive electrode contains lithium iron phosphate having an olivine crystal structure as a positive electrode active material.

4. The lithium ion secondary battery of claim 1, wherein the negative electrode contains a carbon material as a negative electrode active material.

5. The lithium ion secondary battery of claim 1, wherein the nonaqueous electrolyte contains, as the nonaqueous solvent, dibutyl carbonate in addition to the γ-butyrolactone.

6. The lithium ion secondary battery of claim 1, wherein both of the coat formed on the surface of the negative electrode active material layer and the coat formed on the surface of the positive electrode active material layer are formed by an initial charge process.

7. The lithium ion secondary battery of claim 6, wherein the initial charge is performed such that an electric potential of the negative electrode is equal to or below a reduction potential of the vinylene carbonate.

8. The lithium ion secondary battery of claim 7, wherein the concentration of the vinylene carbonate in the nonaqueous electrolyte before the initial charge process is 0.3 mass % or more to 3 mass % or less.

9. The lithium ion secondary battery of claim 7, wherein the concentration of the lithium monoalkyl sulfate in the nonaqueous electrolyte before the initial charge process is 0.3 mass % or more to 1.5 mass % or less.

10. The lithium ion secondary battery of claim 7, wherein the concentration of the lithium bis(oxalate)borate in the nonaqueous electrolyte before the initial charge process is 0.3 mass % or more to 1.5 mass % or less.

11. The lithium ion secondary battery of claim 8, wherein the concentration of the vinylene carbonate in the nonaqueous electrolyte before the initial charge process is 0.5 mass % or more to 2.5 mass % or less.

12. The lithium ion secondary battery of claim 11, wherein
the concentration of the vinylene carbonate in the nonaqueous electrolyte before the initial charge process is 1 mass % or more to 2 mass % or less.

13. The lithium ion secondary battery of claim 9, wherein the concentration of the lithium monoalkyl sulfate in the nonaqueous electrolyte before the initial charge process is 0.5 mass % or more to 1 mass % or less.

14. The lithium ion secondary battery of claim 10, wherein
the concentration of the lithium bis(oxalate)borate in the nonaqueous electrolyte before the initial charge process is 0.5 mass % or more to 1 mass % or less.

* * * * *